United States Patent
Spix

(10) Patent No.: US 8,899,190 B2
(45) Date of Patent: Dec. 2, 2014

(54) TEMPERATURE DEPENDENT FLOW CONTROL FOR COMBUSTION ENGINE PISTON SQUIRTERS

(71) Applicant: GM Global Technology Operations LLC, Detroit, MI (US)

(72) Inventor: Thomas A. Spix, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 20 days.

(21) Appl. No.: 13/871,113

(22) Filed: Apr. 26, 2013

(65) Prior Publication Data

US 2014/0318493 A1 Oct. 30, 2014

(51) Int. Cl.
  F01M 1/02 (2006.01)
  F01M 5/00 (2006.01)
  F01P 1/04 (2006.01)
  F01P 3/08 (2006.01)
  F01M 1/16 (2006.01)
  F01M 1/08 (2006.01)

(52) U.S. Cl.
  CPC .. F01M 1/16 (2013.01); F01M 1/08 (2013.01)
  USPC .................. 123/41.35; 123/41.34; 123/193.6; 123/196 R; 123/196 AB; 123/196 M; 137/468

(58) Field of Classification Search
  USPC .... 123/193.6, 196 R, 196 AB, 196 M, 41.34, 123/41.35
  See application file for complete search history.

(56) References Cited

U.S. PATENT DOCUMENTS

| | | | | |
|---|---|---|---|---|
| 2,388,046 A | * | 10/1945 | Emrich | 251/318 |
| 3,506,194 A | * | 4/1970 | Resseguie | 236/87 |
| 4,114,571 A | * | 9/1978 | Ruf | 123/41.35 |
| 4,284,174 A | * | 8/1981 | Salvana et al. | 184/6.4 |
| 4,364,339 A | * | 12/1982 | Fricker et al. | 123/41.42 |
| 4,708,095 A | * | 11/1987 | Luterek | 123/41.42 |
| 5,217,085 A | * | 6/1993 | Barrie et al. | 184/104.1 |
| 5,819,692 A | * | 10/1998 | Schafer | 123/41.35 |
| 8,549,864 B2 | * | 10/2013 | Langdon et al. | 60/782 |
| 2005/0112008 A1 | * | 5/2005 | Cho et al. | 418/6 |
| 2005/0252997 A1 | * | 11/2005 | Gluck et al. | 239/541 |
| 2006/0283856 A1 | * | 12/2006 | Spinelli et al. | 220/201 |
| 2011/0253230 A1 | * | 10/2011 | Spinelli et al. | 137/468 |
| 2012/0138010 A1 | * | 6/2012 | Ulrey et al. | 123/196 R |
| 2012/0296518 A1 | * | 11/2012 | Bruno et al. | 701/34.4 |
| 2014/0091161 A1 | * | 4/2014 | Yamaguchi et al. | 239/575 |

* cited by examiner

*Primary Examiner* — Noah Kamen
*Assistant Examiner* — Tea Holbrook
(74) *Attorney, Agent, or Firm* — Quinn Law Group, PLLC

(57) ABSTRACT

An engine assembly includes an engine block that defines a cylinder bore. A reciprocating piston is disposed in the cylinder bore, and has a first side and a second side. The first side cooperates with the engine block to partially define a combustion chamber, and the second side is opposite the first side. A piston squirter is disposed adjacent to the second side of the piston and configured to expel a received flow of engine oil onto the piston. A thermal fluid valve is disposed in fluid communication with the piston squirter and is configured to selectively restrict the flow of engine oil to the piston squirter in response to a temperature of the engine oil.

10 Claims, 3 Drawing Sheets

TEMPERATURE DEPENDENT FLOW CONTROL FOR COMBUSTION ENGINE PISTON SQUIRTERS

TECHNICAL FIELD

The present invention relates generally to a system for controlling the flow of oil through one or more oil squirters according to the temperature of the oil.

BACKGROUND

Internal combustion (IC) engines, such as those used in motor vehicles, typically generate heat energy as a by-product of generating power. Generally, such engines are also cooled in order to maintain their operating temperature in a particular range and ensure the engine's efficient and reliable performance for propelling the subject motor vehicle.

In a majority of motor vehicles, IC engines are cooled by a circulating fluid, such as a specially formulated chemical compound mixed with water. Additionally, such engines are lubricated and cooled by oils that are generally derived from petroleum-based and non-petroleum synthesized chemical compounds. Under extreme operating conditions, IC engines generate elevated amounts of heat energy within their combustion chambers. If heat is generated faster than it can be removed using existing cooling systems, it may affect the performance and/or reliability of the engine.

SUMMARY

An engine assembly includes an engine block that defines a cylinder bore, and a reciprocating piston disposed in the cylinder bore. The piston has a first side and a second side, where the first side cooperates with the engine block to partially define a combustion chamber, and the second side is opposite the first side. A piston squirter is disposed adjacent to the second side of the piston and configured to expel a received flow of engine oil onto the piston to cool and lubricate the piston and bore.

A thermal fluid valve is disposed in fluid communication with the piston squirter and is configured to selectively restrict the flow of engine oil to the piston squirter in response to a temperature of the engine oil. The thermal fluid valve may include an inlet, an outlet, and a bi-metallic valve element. The bi-metallic valve element is transitionable between an open state and a closed state in response to a temperature of the bi-metallic valve element, and the thermal fluid valve is configured to restrict the flow of engine oil to the piston squirter when the bi-metallic valve element is in a closed state. Conversely, the thermal fluid valve is configured to permit the flow of engine oil to the piston squirter when the bi-metallic valve element is in an open state.

In one configuration, engine oil is configured to directly contact the bi-metallic valve element, such that the temperature of the bi-metallic valve element is approximately equal to the temperature of the engine oil (i.e., via heat transfer by conduction). The bi-metallic valve element generally includes a first metal layer fused to a second metal layer, where the first metal layer has a coefficient of thermal expansion that is different than a coefficient of thermal expansion of the second metal layer. In this manner, the bi-metallic valve element may deform in response to a temperature change.

The thermal fluid valve may further include a housing that defines the inlet and the outlet, as well as an internal volume in fluid communication with the inlet and the outlet. The bi-metallic valve element may then be disposed within the internal volume, between the inlet and the outlet. The housing may include a control surface abutting and partially defining the internal volume, and adjacent to the outlet. The control surface may define an annular land circumferentially disposed about the outlet, wherein the bi-metallic valve element is configured to contact and seal against the annular land when in a closed state.

The control surface of the valve housing may further define a flow channel extending radially outward from the annular land, and extending away from the bi-metallic valve element. In this manner, engine oil may flow around an edge of the bi-metallic valve element via the flow channel.

The engine assembly may further include an oil reservoir and an oil pump, with the oil pump being in fluid communication with the oil reservoir and with the thermal fluid valve. The oil pump may be configured to provide the flow of oil from the oil reservoir to the piston squirter via the thermal fluid valve.

The engine assembly may further include a rotatable crankshaft. The oil pump may then be further configured to provide a second flow of oil to the rotatable crankshaft.

The above features and advantages and other features and advantages of the present invention are readily apparent from the following detailed description of the best modes for carrying out the invention when taken in connection with the accompanying drawings.

DETAILED DESCRIPTION

Figure 1:
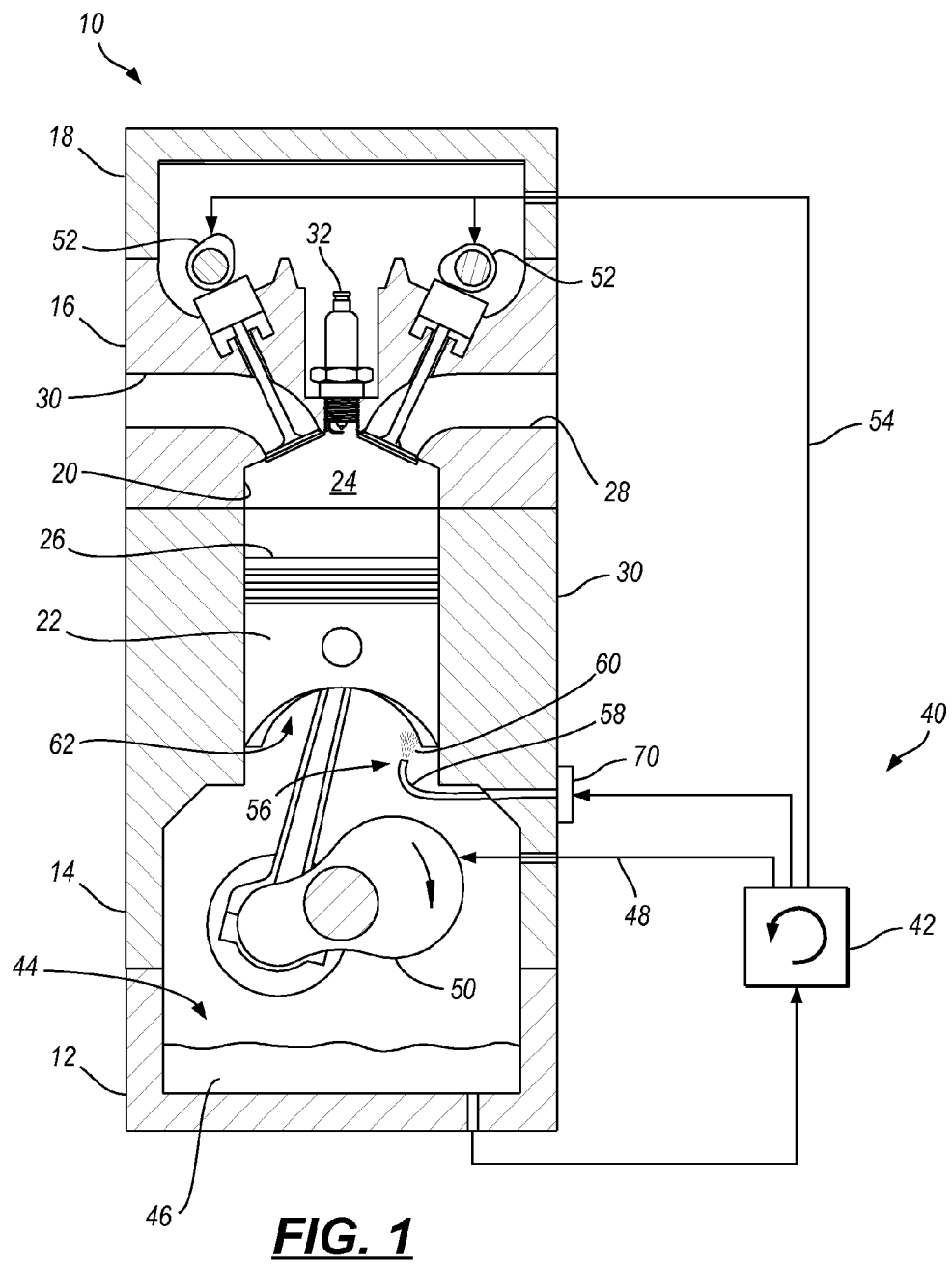
FIG. 1 is a schematic partial cross-sectional illustration of an engine assembly including a piston squirter configured to spray oil directly onto a piston.

Referring to the drawings, wherein like reference numerals are used to identify like or identical components in the various views, FIG. 1 schematically illustrates an engine assembly 10 that may be used to convert a chemical potential of a combustible fuel into a rotational mechanical output. The engine assembly 10 may include an oil pan 12, an engine block 14, a cylinder head 16, and a cylinder head cover 18 that are generally disposed in a stacked arrangement. The engine block 14 may define a plurality of cylinder bores 20 (one of which is shown), with each cylinder bore 20 having a reciprocating piston 22 disposed therein. The plurality of cylinder bores 20 may be arranged in any suitable manner, such as, without limitation, a V-engine arrangement, an inline engine arrangement, and a horizontally opposed engine arrangement, as well as using both overhead cam and cam-in-block configurations.

For each respective cylinder bore 20, the cylinder head 16, engine block 14, and reciprocating piston 22 may cooperate to define a combustion chamber 24 on a first side 26 of the piston 22. The cylinder head 16 may provide one or more intake passages 28 and exhaust passages 30 in selective fluid communication with each respective combustion chamber 24. The intake passage 44 may be used to deliver fresh air to the combustion chamber 24 (e.g., from an intake manifold), where it may mix with an injected aerosol fuel. Following combustion of the air/fuel mixture (such as when ignited by a spark from a spark plug 32), the exhaust passage 30 may carry exhaust gasses out of the combustion chamber 24.

During operation of the engine 10, frictional forces attributable to continuously moving parts may promote unintended wear, fatigue, and/or degradation. To combat this operating friction, the engine assembly 10 may include a lubrication system 40, which may include an oil pump 42 in fluid communication with an oil reservoir 44. In one configuration, the oil pump 42 may be a mechanical pump that may be selectively drivable by a rotational output of the engine. In another configuration, the oil pump 42 may be an electrically operated pump that may be controllably operated by an electric power source (not shown).

The oil reservoir 44 may be partially defined by the oil pan 12 and may contain an engine oil 46, such as a petroleum-based or synthetic-based oil. The oil pump 42 may draw engine oil 46 from the oil reservoir 44, pressurize it, and supply it to various moving components within the engine 10 to lubricate and/or cool those components. For example, as shown in FIG. 1, the oil pump 42 may provide oil 46 via a first supply line 48 to a crankshaft 50, which may constantly rotate with the operation of the engine. Likewise, the oil pump 42 may provide oil 46 to one or more camshafts 52 via a second supply line 54.

In addition to supplying oil 46 to the crankshaft 50 and camshafts 52, as is conventional in combustion engines, the oil pump 42 may further supply oil 46 to one or more piston squirters 56, where the oil may be operative to directly lubricate and/or cool the piston 22. Each piston squirter 56 may include a nozzled portion 58 that may be configured to spray pressurized oil 60 onto an underside (i.e., second side 62) of the piston 22 and/or onto the wall of the engine bore 20. In this manner, the piston/bore interface may be actively lubricated, rather than merely relying on passive oil atomization/splash from the oil reservoir 44 and/or crankshaft 50.

As generally illustrated in FIG. 1, in one configuration, the piston squirter 56 may extend from a portion of the engine block 14, and the nozzled portion 58 may be aimed such that the expelled oil 60 directly contacts the piston 22 when the piston 22 is in a bottom dead center position, and directly contacts the cylinder bore 20 and/or piston 22 when the piston 22 is in a top dead center position. In other configurations, the piston squirter may include an orifice directly formed into the cylinder bore, or into another adjacent component.

As may be appreciated, the primary heat source within the engine assembly 10 is the combustion chamber, where fuel is continuously burned. During periods of extreme and/or prolonged usage, the piston 22 and cylinder bore 20 may accumulate thermal energy faster than it can be dissipated using traditional engine cooling systems. This heat accumulation problem is further accentuated in high-compression engines, which force an increased amount of air/fuel into the combustion chamber with every cycle.

While piston squirters 56 may be operative to lubricate the piston 22/bore 20, during periods of extreme/prolonged use, they may be primarily useful in cooling the piston 22/bore 20 by bathing the components in the (comparatively cooler) engine oil 46. During periods of lighter use, however, the use of piston squirters 56 may be less beneficial, with any marginal cooling and/or lubrication benefits being generally offset by parasitic efficiency losses attributable to the increased oil flow/pumping. Likewise, in certain circumstances, such as low-temperature cold-engine starts, the cooling effect may even be undesirable if the goal is to actively warm the engine to an ideal operating temperature.

Figure 2:
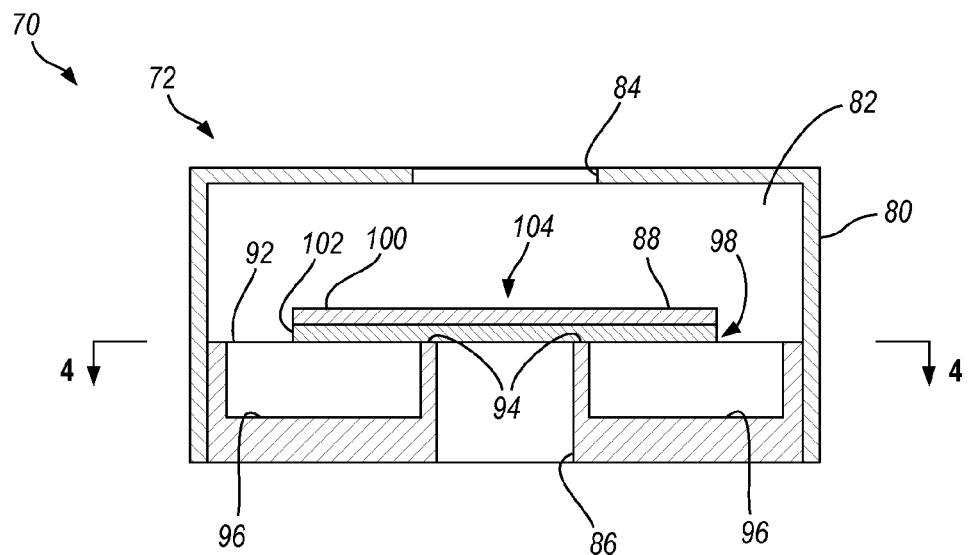
FIG. 2 is a schematic cross-sectional side view of a thermal fluid valve in a closed state.
Figure 3:
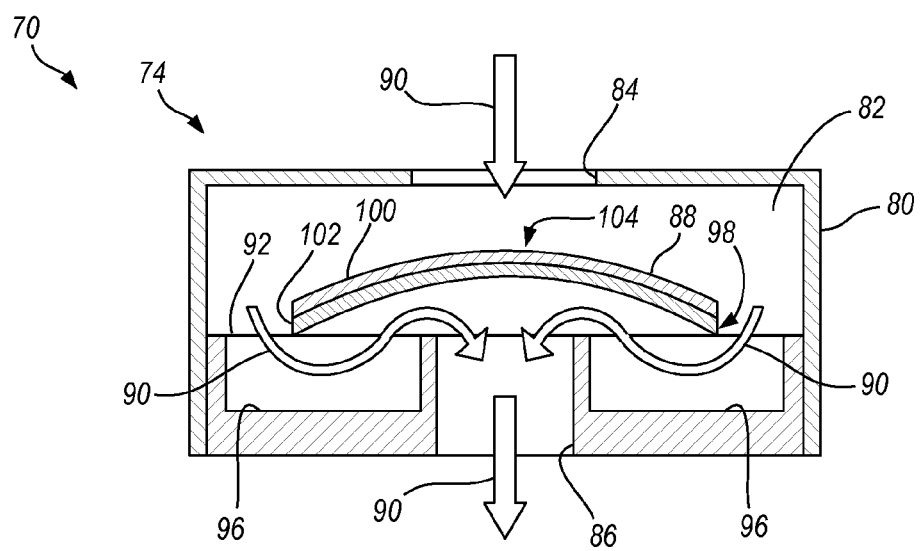
FIG. 3 is a schematic cross-sectional side view of the thermal fluid valve of FIG. 2 in an open state.
Figure 4:
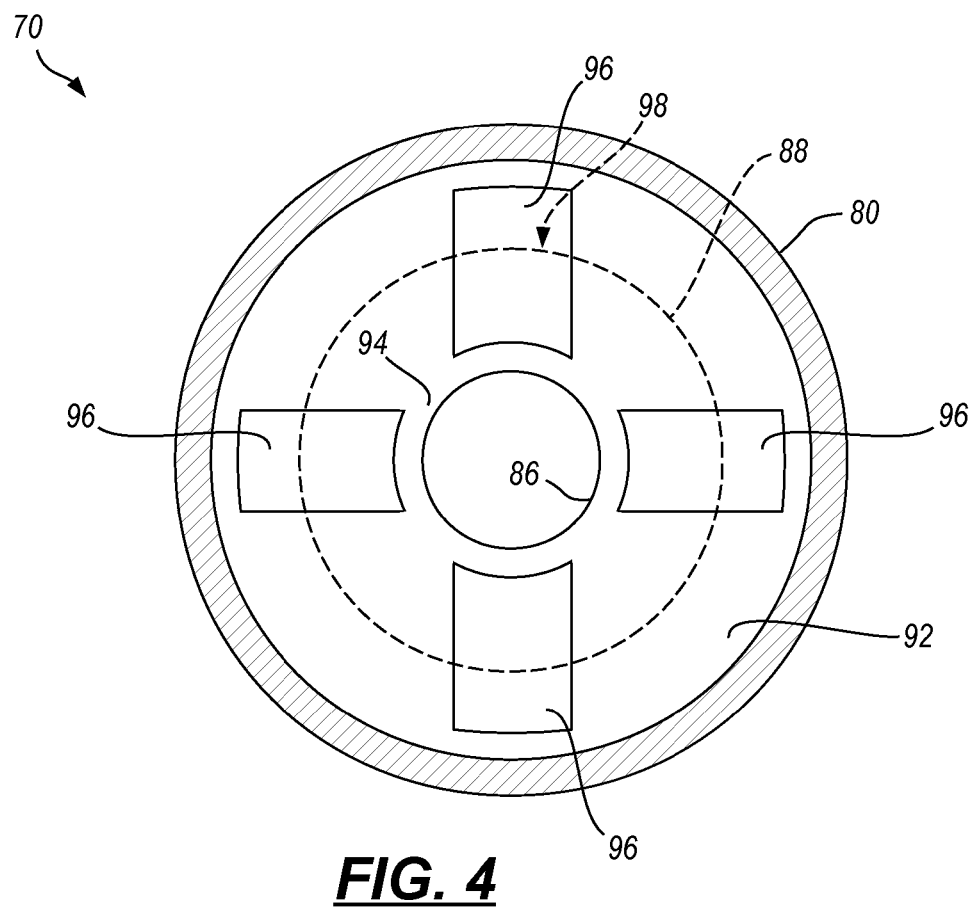
FIG. 4 is a schematic cross-sectional top view of the thermal fluid valve of FIG. 2, taken along line 4-4.

Therefore, in one configuration, the lubrication system 40 may further include a thermal fluid valve 70 that may be configured to automatically open as the temperature engine oil 46 increases above a critical temperature (i.e. suggesting the engine is at or above a temperature where active piston cooling is desirable). FIGS. 2, 3, and 4 illustrate one embodiment of a thermal fluid valve 70 that may be used in the above mentioned lubrication system 40. As shown, FIG. 2 schematically illustrates a cross-sectional side view of the valve 70 in a closed state 72, FIG. 3 schematically illustrates a cross-sectional side view of the valve 70 in an open state 74, and FIG. 4 schematically illustrates a top view of the valve 70 provided in FIGS. 2 and 3.

In one configuration, the thermal fluid valve 70 may be a mechanical apparatus that may automatically transition between a closed state 72 and an open state 74 in response to a change in operating temperature, and without external actuation (e.g., electronic control signals). As shown, the thermal fluid valve 70 may include a housing 80 that defines an internal volume 82 as well as an inlet 84 and an outlet 86 on opposing sides of the internal volume 82. The thermal fluid valve 70 may include a bi-metallic valve element 88 disposed within the housing 80. The bi-metallic valve element 88 may be fluidly disposed between the inlet 84 and the outlet 86, and may be configured to selectively obstruct a fluid flow 90 from the inlet 84 to the outlet 86. As may be appreciated, the inlet 84 may be coupled to and may receive oil 46 from the oil pump 42, while the outlet may be coupled to and may provide oil 46 to the piston squirters 56.

As generally illustrated in FIG. 2, when in a closed state 72, the bi-metallic valve element 88 may be substantially undeformed, and may be forced against a control surface 92 adjacent the outlet 86 by the fluid pressure differential between the pump oil pressure and the crankcase gas pressure. In this state, the bi-metallic valve element 88 may substantially obstruct the outlet 86 and prevent fluid from freely flowing between the inlet 84 and the one or more piston squirters 56.

FIG. 4 more clearly illustrates the control surface 92, with an approximate placement of the bi-metallic valve element 88 provided in phantom. As shown, the control surface 92 defines an annular land 94 circumferentially disposed about the outlet 86. When the valve 70 is in a closed state 72, the bi-metallic valve element 88 may fully rest against the annular land 94 to obstruct flow to the outlet 86. The control surface 92 may further define one or more flow channels 96 that extend radially outward from the annular land 94. Each flow channel 96 may extend away from the bi-metallic valve element 88, and may only be partially covered by the bi-metallic valve element 88. In this manner, the flow channels 96 may allow physical separation between a portion of an outer edge 98 of the bi-metallic valve element 88 and the housing 82.

As illustrated in FIGS. 2 and 3, the bi-metallic valve element 88 may be comprised of two dissimilar metals or metal alloys (e.g., a first metal 100 and a second metal 102) that are fused together. The first and second metals 100, 102 may be selected according to their respective rates of thermal expansion, together with the desired engine operating temperature.

As the temperature of the oil 46 increases, the first metal 100 (i.e., more adjacent to the inlet 54) may expand at a greater rate than the second metal 102. This difference in the expansion rates will cause the center 104 of the bi-metallic valve element 88 to bow away from the annular land 94, as shown in FIG. 3. Once this separation occurs, oil 46 may flow 90 from the inlet 84 into the volume 82, between the annular land 94 and bi-metallic valve element 88, and out of the outlet 86. As the temperature of the oil 46 further increases, the separation may increase, causing more oil 46 to flow to the piston squirters 56 to cool the pistons 22 and bores 20.

In a slightly varied embodiment, the thermal fluid valve 70 may be disposed on an interior surface of the engine block 14 and/or may be integrated within the piston squirters 56. In this manner, the relationship between piston/bore temperature and oil flow may be more direct. Furthermore, while FIG. 1 illustrates the oil pump 42 and supply lines 48, 54 as external to the engine assembly 10, in alternate embodiments, the pump may be disposed within the engine block 14/oil pan 12, and the various supply lines may include one or more bores, conduits, or other such flow paths provided within the walls of the engine assembly 10.

The present thermal fluid valve 70 may permit the engine's primary oil pump 42 to supply oil 46 directly to the pistons 22 only when needed, and without affecting the oil supply to the remaining components or causing efficiency loses when not needed. Employing a purely mechanical, yet temperature-dependent valve eliminates any need for electronic sensors or complex fluid actuators that would need to be designed to handle the high temperature of the engine. While the embodiment described above illustrates one potential configuration of a temperature dependent fluid valve, it is contemplated that other configurations may be used.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. An engine assembly comprising:
   an engine block defining a cylinder bore;
   a piston disposed in the cylinder bore, the piston having a first side that cooperates with the engine block to partially define a combustion chamber, and having a second side that is opposite the first side;
   a piston squirter disposed adjacent to the second side of the piston and configured to expel a received flow of engine oil onto the piston; and
   a thermal fluid valve in fluid communication with the piston squirter and configured to selectively restrict the flow of engine oil to the piston squirter in response to a temperature of the engine oil, the thermal fluid valve including:
      a housing defining an inlet, an outlet, and an internal volume in fluid communication with the inlet and the outlet, wherein the housing includes a control surface abutting and partially defining the internal volume, and adjacent to the outlet, and wherein the control surface defines an annular land circumferentially disposed about the outlet;
      a bi-metallic valve element disposed within the internal volume and between the inlet and the outlet;
      wherein the bi-metallic valve element is configured to contact the annular land when in a closed state;
   wherein the bi-metallic valve element is transitionable between an open state and a closed state in response to a temperature of the bi-metallic valve element;
   wherein the thermal fluid valve is configured to restrict the flow of engine oil to the piston squirter when the bi-metallic valve element is in a closed state; and
   wherein the thermal fluid valve is configured to permit the flow of engine oil to the piston squirter when the bi-metallic valve element is in an open state.

2. The engine assembly of claim 1, wherein the flow of engine oil is configured to directly contact the bi-metallic valve element; and
   wherein the temperature of the bi-metallic valve element is approximately equal to the temperature of the engine oil.

3. The engine assembly of claim 1, wherein the bi-metallic valve element includes a first metal layer fused to a second metal layer; and
   wherein the first metal layer has a coefficient of thermal expansion that is different than a coefficient of thermal expansion of the second metal layer.

4. The engine assembly of claim 1, wherein the control surface further defines a flow channel extending radially outward from the annular land, and extending away from the bi-metallic valve element such that the engine oil may flow around an edge of the bi-metallic valve element via the flow channel.

5. The engine assembly of claim 1, further comprising an oil reservoir and an oil pump, wherein the oil pump is in fluid communication with the oil reservoir and with the thermal fluid valve; and
   wherein the oil pump is configured to provide the flow of oil from the oil reservoir to the piston squirter through the thermal fluid valve.

6. The engine assembly of claim 1, further comprising a rotatable crankshaft; and
   wherein the oil pump is further configured to provide a second flow of oil to the rotatable crankshaft.

7. An engine assembly comprising:
   an engine block defining a cylinder bore;
   a piston disposed in the cylinder bore, the piston having a first side that cooperates with the engine block to partially define a combustion chamber, and having a second side that is opposite the first side;
   a rotatable crankshaft in mechanical communication with the piston;
   an oil reservoir containing an engine oil;
   an oil pump in fluid communication with the oil reservoir and configured to provide a first flow of engine oil and a second flow of engine oil, the second flow of engine oil being provided to the rotatable crankshaft;
   a piston squirter disposed adjacent to the second side of the piston and configured to receive the first flow of engine oil, and expel the received engine oil onto the piston; and
   a thermal fluid valve fluidly disposed between the piston squirter and the oil pump and configured to selectively restrict the first flow of engine oil to the piston squirter in response to a temperature of the engine oil, the thermal fluid valve including:
      a housing defining an inlet, an outlet, and an internal volume in fluid communication with the inlet and the outlet, wherein the housing includes a control surface abutting and partially defining the internal volume, and adjacent to the outlet, and wherein the control surface defines an annular land circumferentially disposed about the outlet;
      a bi-metallic valve element disposed within the internal volume and between the inlet and the outlet;
      wherein the bi-metallic valve element is configured to contact the annular land when in a closed state;
   wherein the bi-metallic valve element is transitionable between an open state and a closed state in response to a temperature of the bi-metallic valve element;
   wherein the thermal fluid valve is configured to restrict the flow of engine oil to the piston squirter when the bi-metallic valve element is in a closed state; and wherein the thermal fluid valve is configured to permit the flow of engine oil to the piston squirter when the bi-metallic valve element is in an open state.

8. The engine assembly of claim 7, wherein the flow of engine oil is configured to directly contact the bi-metallic valve element; and
wherein the temperature of the bi-metallic valve element is approximately equal to the temperature of the engine oil.

9. The engine assembly of claim 7, wherein the bi-metallic valve element includes a first metal layer fused to a second metal layer; and
wherein the first metal layer has a coefficient of thermal expansion that is different than a coefficient of thermal expansion of the second metal layer.

10. The engine assembly of claim 7, wherein the control surface further defines a flow channel extending radially outward from the annular land, and extending away from the bi-metallic valve element such that the engine oil may flow around an edge of the bi-metallic valve element via the flow channel.

* * * * *